United States Patent
Schneiter

(10) Patent No.: US 7,255,003 B2
(45) Date of Patent: Aug. 14, 2007

(54) DEVICE FOR MEASURING AND DISPLAYING THE AMOUNT OF BEER IN A KEG

(76) Inventor: Calvin R. Schneiter, 2285 Broadway, #1, San Francisco, CA (US) 94115

( * ) Notice: Subject to any disclaimer, the term of this patent is extended or adjusted under 35 U.S.C. 154(b) by 0 days.

(21) Appl. No.: 11/224,499

(22) Filed: Sep. 12, 2005

(65) Prior Publication Data

US 2007/0056368 A1   Mar. 15, 2007

(51) Int. Cl.
G01F 23/20 (2006.01)
G01G 21/22 (2006.01)
G01G 23/01 (2006.01)

(52) U.S. Cl. .......... 73/296; 177/169; 177/225; 177/245; 177/253; 73/1.13

(58) Field of Classification Search .......... 177/169, 177/225, 245, 253; 73/296, 1.13
See application file for complete search history.

(56) References Cited

U.S. PATENT DOCUMENTS

| | | | |
|---|---|---|---|
| 698,334 A | 4/1902 | Smith | |
| 2,330,857 A | 10/1943 | Alcott | |
| 4,002,215 A | 1/1977 | Harvill | |
| 4,319,651 A * | 3/1982 | Robichaud | 177/229 |
| 4,382,478 A * | 5/1983 | Hearn | 177/169 |
| 4,474,255 A | 10/1984 | Blok et al. | |
| 4,992,775 A * | 2/1991 | Castle et al. | 340/525 |
| 5,837,944 A | 11/1998 | Herot | |
| 6,222,137 B1 | 4/2001 | Handford | |
| 6,590,166 B2 * | 7/2003 | Yoshida | 177/25.13 |
| 6,864,436 B1 * | 3/2005 | Nobes et al. | 177/25.13 |
| 6,968,805 B1 * | 11/2005 | Rathbun | 116/227 |
| 2005/0000737 A1 | 1/2005 | Fox et al. | |
| 2005/0120793 A1 * | 6/2005 | Cochran, Jr. et al. | |

FOREIGN PATENT DOCUMENTS

GB       2131559 A *   6/1984   .......... 73/296

* cited by examiner

*Primary Examiner*—Randy W Gibson
(74) *Attorney, Agent, or Firm*—Snell & Wilmer L.L.P.

(57) ABSTRACT

A scale for determining a quantity of material in a container such as a keg. The scale may include a support member configured to be placed under a portion of the container, a display to indicate the quantity of material in the container, and a weight sensor positioned underneath the support member to determine the quantity of material in the container and to provide a signal to the display.

21 Claims, 5 Drawing Sheets

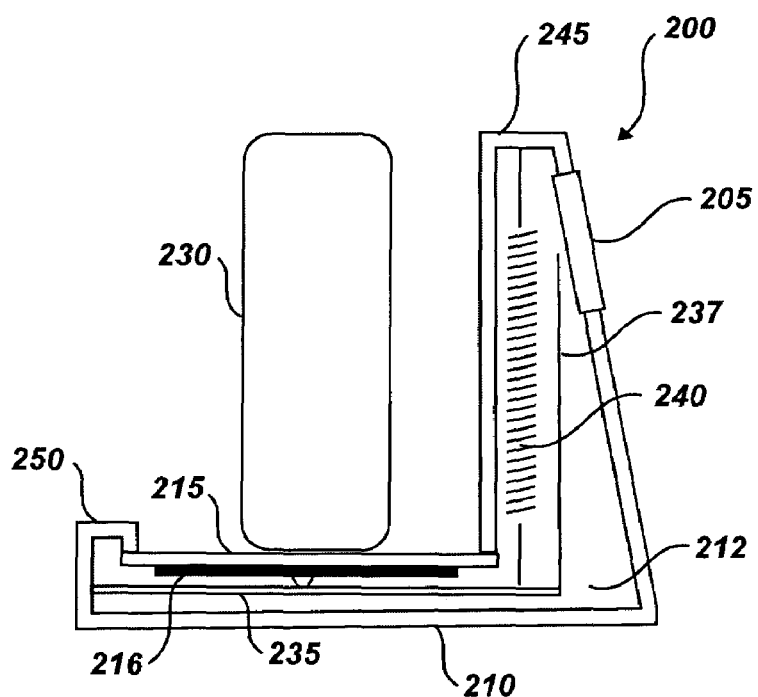
Fig. 3
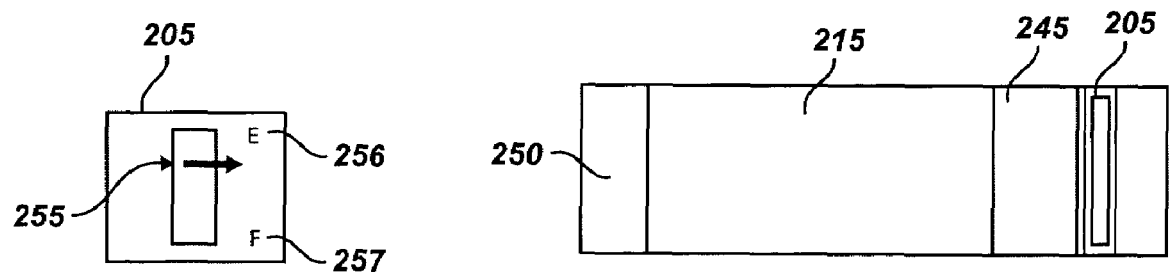
Fig. 5             Fig. 4

DEVICE FOR MEASURING AND DISPLAYING THE AMOUNT OF BEER IN A KEG

FIELD OF THE INVENTION

The invention relates generally to the measurement and display of the amount of material in a container, and more particularly, to a device for measuring and displaying the amount of beer in a keg.

DESCRIPTION OF THE RELATED ART

Kegs are barrels that hold fluid such as beer under pressure. Due to the pressure within the keg, these barrels are generally made of a metallic material such as an aluminum material. Since kegs are a staple of bars, restaurants, and other establishments, there is often a need to know the amount of beer in a keg to determine when to replace an empty keg with a full keg. Unlike other containers that are transparent, kegs are opaque. Thus, a simple visual inspection to determine the amount of fluid in a keg is not possible. Furthermore, with a full keg weighing over 150 lbs, it is not practical to constantly lift the keg to determine the amount of beer in the keg.

Scales that hold an entire keg have been proposed, however, these scales are impractical and unsatisfactory because they require a large amount of space and the lifting of the heavy keg. Lifting such heavy objects requires bulky equipment or an extremely strong person. Furthermore, it can cause extreme strain on a person lifting the heavy keg.

Therefore, there is a need for a keg scale that is small and easy to use and that does not require the lifting of the entire keg to determine the amount of beer in the keg. The invention fulfills this need as well as others.

SUMMARY OF THE INVENTION

One embodiment of the invention includes a scale for determining a quantity of material in a container. The scale may include a support member configured to be placed under a portion of the container, a display to indicate the quantity of material in the container, and a weight sensor positioned underneath the support member to determine the quantity of material in the container and to provide a signal to the display.

One embodiment of the invention includes a scale for determining a quantity of material within a keg. The scale may include a housing defining a cavity, a lever arm positioned within the cavity and having a first end attached to the housing and a second end moveable between a first position and a second position wherein when the keg that is full of fluid is first placed on the scale, the lever arm is in the first position and as the fluid is gradually consumed from the keg, the lever arm gradually moves from the first position to the second position, a spring having a first end attached to the housing and a second end attached to the second end of the lever arm, a plate positioned on top of the lever arm with a protrusion at a bottom surface of the plate to move the lever arm depending on the quantity of material in the keg, a pad positioned on top of the plate to contact a rim of the keg and to move the plate depending on the quantity of material in the keg wherein a surface area of the pad is smaller than a surface area of a bottom surface of the keg, a first raised portion and a second raised portion on opposite ends of the pad, a display having an empty indicator and a full indicator; attached to at least one of the lever arm or spring to display the amount of material in the keg, and a display pin within the display attached to at least one of the lever arm or spring capable of moving between the full indicator and the empty indicator in response to the lever arm moving from the first position to the second position.

BRIEF DESCRIPTION OF THE DRAWINGS

FIG. 3 is a cross-sectional view of a keg scale having a housing with mechanical components contained therein that are used to determine the amount (e.g., weight) of fluid in the keg according to one embodiment of the invention;

FIG. 4 is a top view of the keg scale of FIG. 3 illustrating the display, the pad, the first raised portion and the second raised portion according to one embodiment of the invention;

FIG. 5 is a front view of the display illustrating the movable indicator, an empty indicator and a full indicator according to one embodiment of the invention;

DETAILED DESCRIPTION

Methods and systems that implement the embodiments of the various features of the invention will now be described with reference to the drawings. The drawings and the associated descriptions are provided to illustrate embodiments of the invention and not to limit the scope of the invention. Furthermore, the invention is not limited to only the uses provided below but can be expanded where the use of the invention is appropriate. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements.

Figure 1:
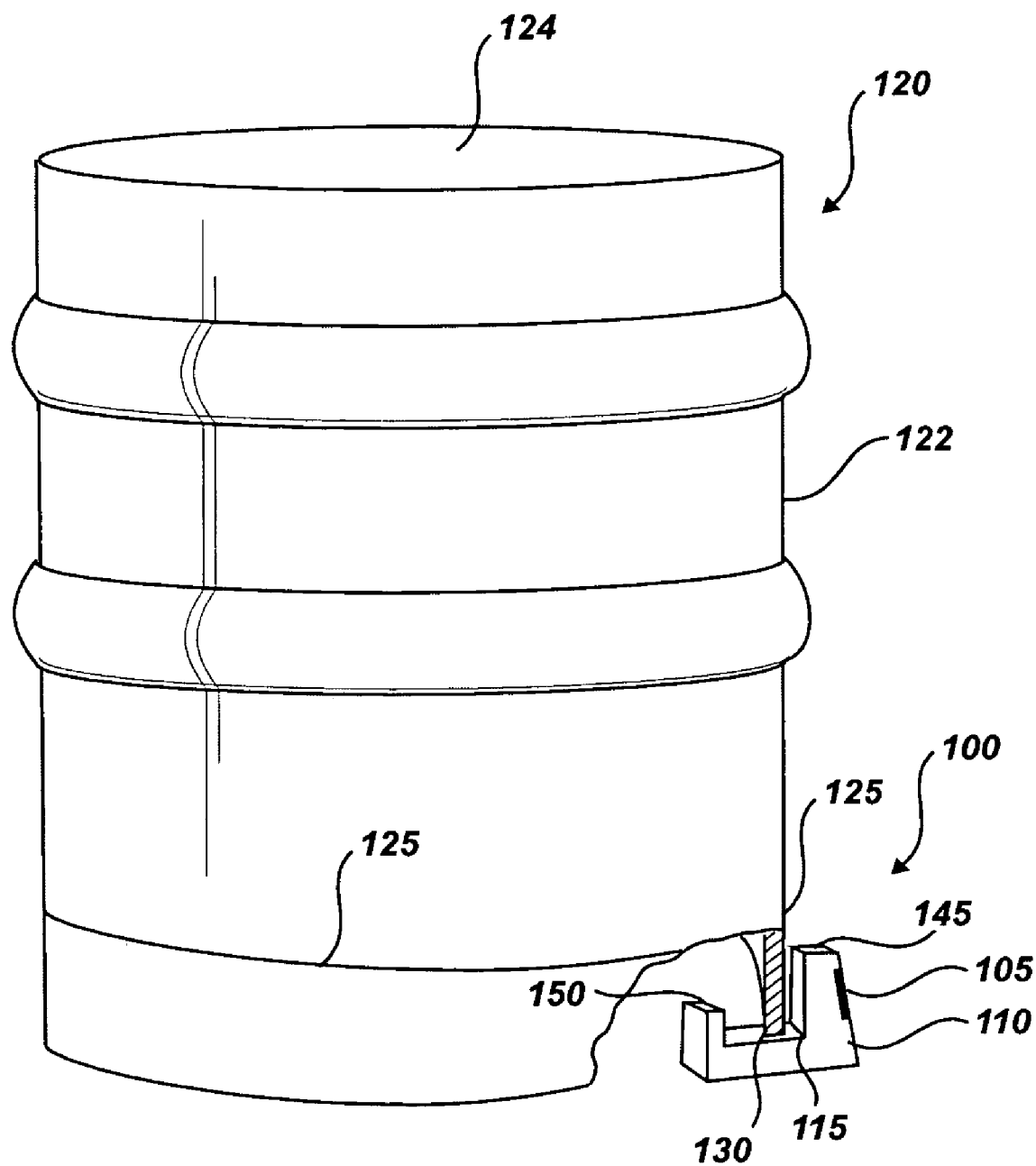
FIG. 1 is a perspective view of a keg positioned on a keg scale according to one embodiment of the invention.
Figure 2:
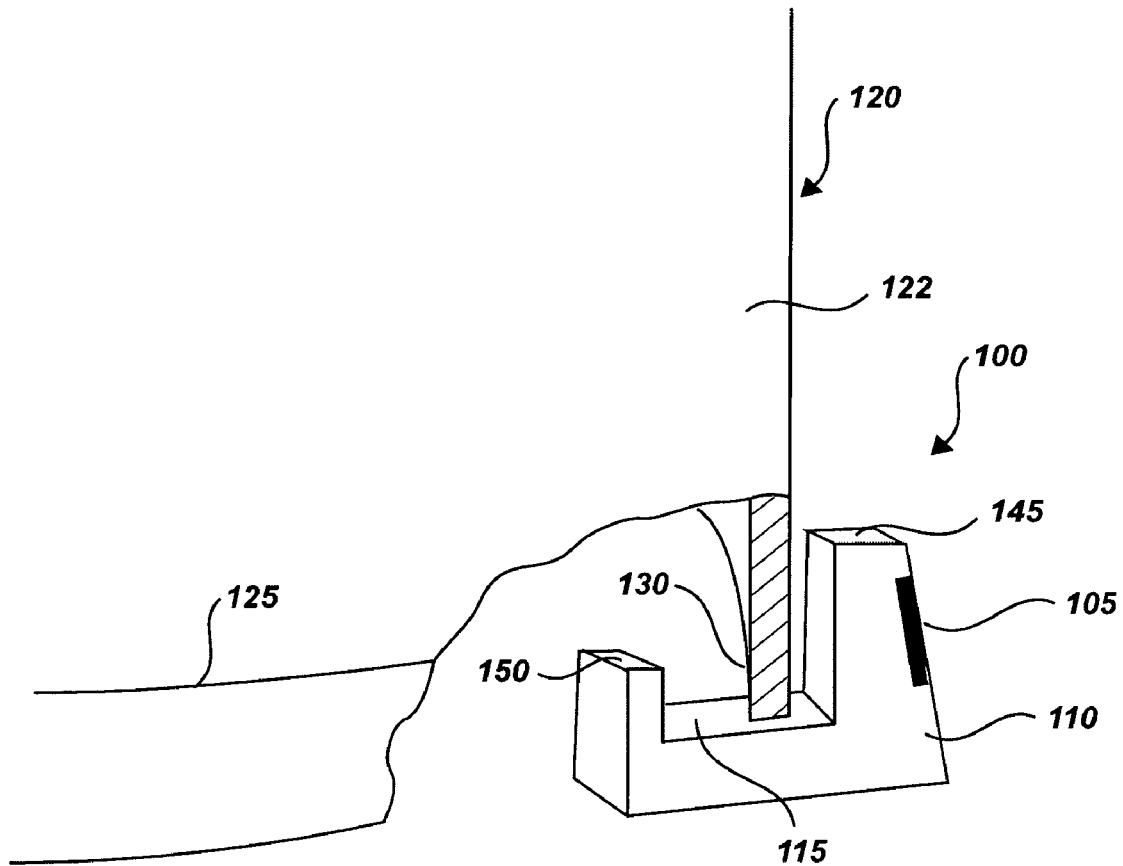
FIG. 2 is an exploded perspective view of a portion of the keg and the keg scale of FIG. 1 according to one embodiment of the invention.

Referring now more particularly to the drawings, FIG. 1 is a perspective view of a keg 120 positioned on a keg scale 100 and FIG. 2 is an exploded perspective view of a portion of the keg 120 and the keg scale 100 of FIG. 1. Typically, the keg 120 is formed in the shape of a cylinder and has a side surface 122, a top surface 124, a bottom surface 125 and a rim 130 extending downward from the bottom surface 125. In one embodiment, the rim 130 extends around the entire circumference of the keg 120. The fluid (e.g., beer) is held within the side, top and bottom surfaces 122, 124 and 125 of the keg 120. The fluid is generally maintained under a pressure.

The keg scale 100 may have a display 105, a pad 115, and a housing 110 that includes a first raised portion 145 and a second raised portion 150. The display 105 may be located on the first raised portion 145 to indicate the amount of fluid in the keg 120. The pad 115 may be positioned between the first raised portion 145 and the second raised portion 150. The first raised portion 145 has a height that is greater than the second raised portion 150. The lower height of the second raised portion 150 allows the keg 120 to lifted only a small distance while the keg scale 100 is pushed under the rim 130. The higher height of the first raised portion 145 helps to prevent the keg scale 100 from being pushed completely under the keg 120. The larger first raised portion 145 also allows the user to use his foot to slide the keg scale 100 into position while at the same time lifting or tilting the keg 120. This allows a single user to lift the keg 120 and push the keg scale 100 into position.

To measure the amount of fluid in the keg 120, the rim 130 of the keg 120 is lifted and positioned to contact or rest on the pad 115 of the keg scale 100. The entire keg 120 does not have to be lifted but can be tilted to be positioned on the pad 115. As shown, the entire keg 120 does not rest on the pad 115; rather, only a portion of the rim 130 rests on the pad 115. Depending on the amount of fluid in the keg 120, the pad 115 is pushed down a certain distance and the amount of fluid in the keg 120 is indicated on the display 105. The first raised portion 145 and the second raised portion 150 also help to prevent the rim 130 of the keg 120 from slipping off the pad 115. Typically, the pad 115 is positioned along a horizontal plane and the first and second raised portions 145 and 150 are positioned along vertical planes that are substantially perpendicular to the horizontal plane.

FIG. 3 is a cross-sectional view of a keg scale 200 having a housing 210 with mechanical components contained therein that are used to determine the amount (e.g., weight) of fluid in the keg 120. The housing 210 defines a cavity 212 that contains a plate 216, a lever arm 235, a connector 237 and a spring 240. The rim 230 of the keg 120 rests on top of the pad 215 with the first raised portion 245 and the second raised portion 250 preventing the rim 230 from slipping off the pad 215. The pad 215 translates the resulting force from the rim 230 onto the plate 216 with the plate 216 pushing down on the lever arm 235.

The lever arm 235 is connected on one end to the housing 210 and on the other end to the spring 240. The spring 240 is connected on one end to the housing 210 and on the other end to the lever arm 235. The spring 240 is interchangeable and calibrateable. This allows the user to gauge the amount of beer in the keg 220 more accurately because the spring 240 can be specifically designed for the keg 220 or can be calibrated to the specific weight of the keg 220 when it is full or empty. When the keg 220 contains fluid, the plate 216 pushes down on the lever arm 235, through the initial placement of the rim 230 on the pad 215, causing the lever arm 235 and spring 240 to move to a first position. As beer in the keg 120 is gradually consumed, the lever arm 235 and spring 240 gradually move from the first position toward a second position. In one embodiment, the first position is a full position and the second position is an empty position. The connector 237 is connected from the display 205 to the spring 240 and/or the lever arm 235. The connector 237 is connected at one end to a movable indicator 255 that moves as the connector 237 moves (see also FIG. 5).

FIG. 4 is a top view of the keg scale of FIG. 3 illustrating the display 205, the pad 215, the first raised portion 245 and the second raised portion 250. As shown, the pad 215 is positioned between the first raised portion 245 and the second raised portion 250.

FIG. 5 is a front view of the display 205 illustrating the movable indicator 255, an empty indicator 256 and a full indicator 257. The movable indicator 255 is attached or linked to the connector 237. As the beer is gradually consumed and the lever arm 235 and the spring 240 move from the first position to the second position, the movable indicator 255 moves from the full indicator 257 to the empty indicator 256.

Figure 6:
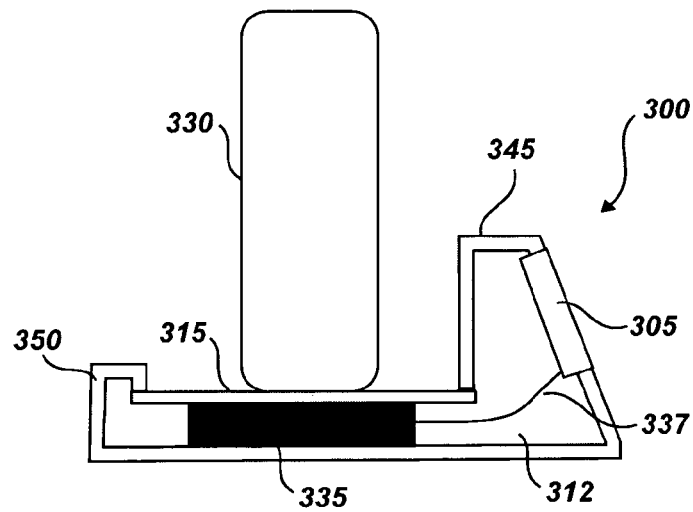
FIG. 6 is a cross-sectional view of a keg scale having a housing with electronic components contained therein that are used to determine the amount (e.g., weight) of fluid in the keg according to one embodiment of the invention.

FIG. 6 is a cross-sectional view of a keg scale 300 having a housing 310 with electronic components contained therein that are used to determine the amount (e.g., weight) of fluid in the keg 120. The keg scale 300 has a display 305, a pad 315, a first raised portion 345 and a second raised portion 350. The housing 310 has a cavity 312, which contains a load cell 335 and a connector 337.

The rim 330 of the keg 120 containing beer rests on top of the pad 315 with the first raised portion 345 and the second raised portion 350 preventing the rim 330 from slipping off the pad 315. The pad 315 translates the resulting force from the rim 330 onto the load cell 335. The load cell 335 can be programmed to determine the amount of fluid within the keg 120. The load cell 335 is connected to the display 305 by the connector 337. The display 305 has a visual representation (e.g., a LED, an indicator, etc.) of the amount of beer in the keg 120 and at least one calibration device 358 (e.g. a button, a switch, etc.) to calibrate the keg scale 300 (e.g., the load cell 335).

Figure 7:
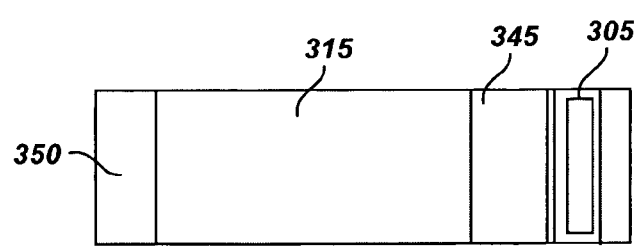
FIG. 7 is a top view of the keg scale of FIG. 6 illustrating the display, the pad, the first raised portion and the second raised portion according to one embodiment of the invention.

FIG. 7 is a top view of the keg scale 300 of FIG. 6 illustrating the display 305, the pad 315, the first raised portion 345 and the second raised portion 350. As shown, the pad 315 is positioned between the first raised portion 345 and the second raised portion 350.

Figure 8:
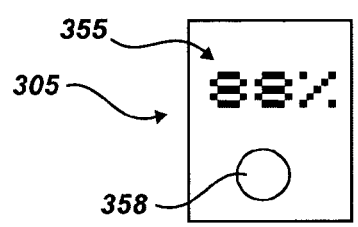
FIG. 8 is a front view of the display illustrating an LED and a calibration device according to one embodiment of the invention.

FIG. 8 is a front view of the display 305 illustrating an LED 355 and a calibration device 358. The LED 355 shows the percentage of fluid in the keg 120 and the calibration device 358 is used to calibrate the keg scale 300. In one embodiment, the calibration device 358 can be programmed to know the weight of the keg 120 when empty and when full. This will allow the calibration device 358 to display on the LED 355 the correct amount of fluid in the keg 120 as the fluid is consumed.

Figure 9:
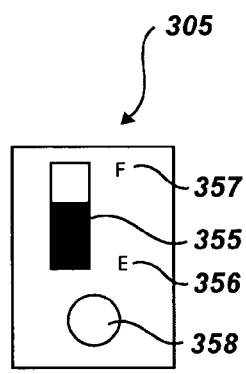
FIG. 9 is a front view of the display illustrating an indicator, an empty indicator, a full indicator and a calibration device according to one embodiment of the invention.

FIG. 9 is a front view of the display 305 illustrating an indicator 355, an empty indicator 356, a full indicator 357 and a calibration device 358. The indicator 355 will be at the full indicator 357 when the keg is full of beer, at the empty indicator 356 when the keg is empty, and proportionally between the full indicator 357 and the empty indicator 356 depending on the amount of beer in the keg 120. The calibration device 358 allows calibration of the keg scale 300.

Figure 10:
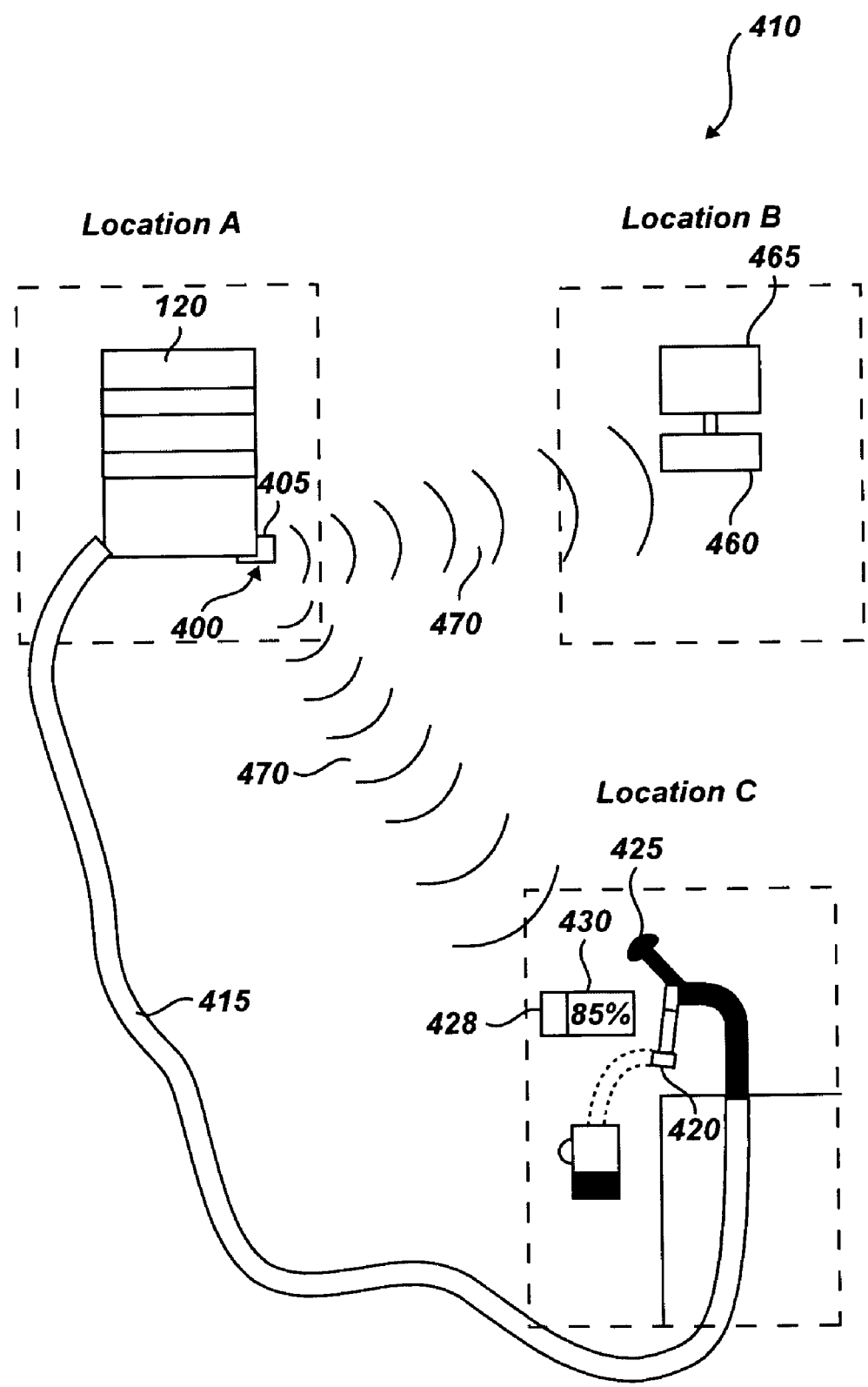
FIG. 10 is a simplified block diagram of a keg scale system where the keg scale wirelessly transmits a weight signal to the display, which is located at a remote location relative to the keg scale, according to one embodiment of the invention.

FIG. 10 is a front view of a wireless keg scale system 410 for transmitting weight information 470 on the amount of beer in the keg 120 from location A to location B and/or location C. The wireless keg scale system 410 may include the keg 120, a keg scale 400, a transmitter 405, a fluid line 415, a receiver 460, a monitor 465, a beer dispenser 420, a handle 425, a receiver 428 and a display 430. The keg scale 400 is similar to the keg scale 300. The keg scale 400 includes the transmitter 405 that generally replaces the display 305. The keg 120 may be located in location A (e.g., a freezer compartment with many other kegs to stay cool). Each transmitter 405 transmits a different weight signal to its respective receivers 428 and 460. One receiver 460 may be located at a monitoring station (location B), which monitors all the kegs to make sure they each contain beer. A restaurant manager may keep track of all the kegs and when one of the kegs is close to being empty, may instruct a stock person to replace the empty key with a full keg. This allows a bar with many different brands of beers to keep track of the content in each keg and efficiently prepare for the replacement of kegs as they become empty. Also, the restaurant can easily track how fast each keg of beer is being consumed and the beers that are most consumed. The monitor 465 can display each brand of beer and the amount of beer remaining for each brand.

The transmitter 405 can also send a weight signal to the receiver 428 at location C (e.g., a bar). The receiver 428 and the display 430 can be located adjacent to its corresponding beer dispenser 420 and handle 425. This allows the bartender to know when the particular beer is about to be empty. The handle 425 is used to open and close the flow of beer through the beer dispenser 420. The fluid line 415 carries the beer from the keg 120 to the beer dispenser 420.

Although different embodiments of the invention have been shown and described, many other changes, combinations, omissions, modifications, and substitutions, in addition to those set forth in the above paragraphs may be made by a person having ordinary skill in the arts without necessarily departing from the spirit and scope of this invention. Furthermore, the use of the present invention is not limited to only kegs and beers, but can be expanded accordingly by a person having ordinary skill in the art. Therefore, this invention is not intended to be limited by the preferred embodiments or indicated uses, but is to be defined by reference to the appended claims.

What is claimed is:

1. A scale for determining a quantity of fluid in a container comprising:
   a support member configured to be placed under a portion of the container;
   a display to indicate the quantity of fluid in the container;
   a weight sensor positioned underneath the support member to determine the quantity of fluid in the container and to provide a signal to the display; and
   a calibration device to calibrate the weight sensor.

2. The scale according to claim 1 wherein the weight sensor includes a lever arm and a spring.

3. A scale for determining a quantity of fluid in a container comprising:
   a support member configured to be placed under a portion of the container;
   a display to indicate the quantity of fluid in the container; and
   a weight sensor positioned underneath the support member to determine the quantity of fluid in the container and to provide a signal to the display,
   wherein the weight sensor includes an electronic load cell.

4. The scale according to claim 1 further comprising a housing having a first raised portion and a second raised portion positioned on opposite ends of the support member.

5. A scale for determining a quantity of fluid in a container comprising:
   a support member configured to be placed under a portion of the container;
   a display to indicate the quantity of fluid in the container; and
   a weight sensor positioned underneath the support member to determine the quantity of fluid in the container and to provide a signal to the display,
   wherein the weight sensor wirelessly transmits information to the display.

6. A scale for determining a quantity of fluid within a keg comprising:
   a pad to contact a rim of the container wherein a surface area of the pad is smaller than a surface area of a bottom surface of the container;
   at least one raised portion on an end of the pad;
   a display to indicate a measurement of the quantity of material within the container; and
   a weight sensor positioned underneath the pad to determine the quantity of material within the container and to provide a signal to the display.

7. The scale according to claim 6 wherein the weight sensor uses a lever arm and a plate in conjunction with a spring and the display is analog.

8. The scale according to claim 6 wherein the weight sensor uses a load cell and the display is digital.

9. The scale according to claim 6 wherein the display contains at least one button to calibrate the weight sensor when the container is empty and when the container is full.

10. The scale according to claim 6 wherein the spring is interchangeable and calibrateable.

11. The scale according to claim 6 wherein the pad has a first raised portion and a second raised portion on opposite ends of the pad.

12. The scale according to claim 6 wherein the weight sensor transmits information to the display wirelessly.

13. A scale for determining a quantity of material within a keg comprising:
   a housing;
   a lever arm having a first end connected to the housing and a second end free, the lever arm moveable between a first position and a second position wherein when the keg that is full of fluid is first placed on the scale, the lever arm is in the first position and as the fluid is gradually consumed from the keg, the lever arm gradually moves from the first position to the second position;
   a spring having a first end connected to the housing and a second end connected to the lever arm;
   a display having an empty indicator and a full indicator; and
   a display indicator attached to at least one of the lever arm or the spring capable of moving between the full indicator and the empty indicator in response to the lever arm moving from the first position to the second position.

14. The scale according to claim 13 wherein the spring is interchangeable and calibrateable.

15. The scale according to claim 13 wherein the housing has at least one raised portion.

16. A scale for determining a quantity of material within a keg comprising:
   a housing defining a cavity and having a first raised portion and a second raised portion;
   a load cell positioned within the cavity to determine the quantity of material within the keg;
   a pad positioned between the first raised portion and the second raised portion and on top of the load cell to contact a rim of the keg wherein a surface area of the pad is smaller than a surface area of a bottom surface of the keg; and a display to receive a signal from the load cell wherein the display contains at least one control device to calibrate the load cell when the container is empty and when the container is full.

17. The scale according to claim 16 wherein the display contains an LCD screen for displaying the quantity of material within a keg in terms of percentage.

18. The scale according to claim 16 wherein the display contains a first bar with an indicator for full on one end and an indicator for empty on an opposite end and a second bar within the first bar which gradually moves from the indicator for full to the indicator for empty as the material within the keg is gradually consumed.

19. The scale according to claim 16 wherein the load cell transmits information to the display wirelessly.

20. The scale according to claim 15 further comprising a first raised portion and a second raised portion, wherein the first raised portion has a first height and the second raised portion has a second height, the first height being greater than the second height.

21. The scale according to claim 13 wherein the second end of the lever arm comprises a raised portion.

* * * * *